United States Patent
Harada et al.

(10) Patent No.: US 7,634,481 B2
(45) Date of Patent: Dec. 15, 2009

(54) FILE CREATION METHOD, SERVER, COMPUTER TERMINAL, RECORDING MEDIUM, INFORMATION PROCESSING APPARATUS, AND PROGRAM ADDITION SYSTEM

(75) Inventors: Tohru Harada, Kanagawa (JP); Hiroyuki Kimbara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 573 days.

(21) Appl. No.: 10/802,769

(22) Filed: Mar. 18, 2004

(65) Prior Publication Data

US 2004/0187008 A1 Sep. 23, 2004

(30) Foreign Application Priority Data

Mar. 19, 2003 (JP) .............................. 2003-076605
Mar. 2, 2004 (JP) .............................. 2004-057680

(51) Int. Cl.
*G06F 7/00* (2006.01)
*G06F 17/00* (2006.01)

(52) U.S. Cl. ............................... 707/100; 707/1; 707/9; 707/204

(58) Field of Classification Search ........................ None
See application file for complete search history.

(56) References Cited

U.S. PATENT DOCUMENTS

| | | | |
|---|---|---|---|
| 5,805,699 A | 9/1998 | Akiyama et al. | |
| 6,247,128 B1 * | 6/2001 | Fisher et al. | 713/100 |
| 6,687,829 B1 | 2/2004 | Miyamoto et al. | |
| 7,043,493 B2 * | 5/2006 | Guthery | 707/101 |
| 7,185,014 B1 * | 2/2007 | Hansen | 707/10 |
| 2002/0116478 A1 * | 8/2002 | Paradinas et al. | 709/220 |
| 2003/0046681 A1 * | 3/2003 | Barturen et al. | 717/177 |
| 2003/0195842 A1 * | 10/2003 | Reece | 705/39 |
| 2003/0225797 A1 * | 12/2003 | Shields et al. | 707/202 |
| 2004/0040026 A1 * | 2/2004 | Farrugia | 719/310 |
| 2004/0178261 A1 * | 9/2004 | Potonniee et al. | 235/380 |
| 2004/0198496 A1 * | 10/2004 | Gatto et al. | 463/42 |
| 2004/0261060 A1 * | 12/2004 | Haselden et al. | 717/120 |
| 2005/0120106 A1 * | 6/2005 | Albertao | 709/223 |

FOREIGN PATENT DOCUMENTS

| | | |
|---|---|---|
| JP | 10-83297 | 3/1998 |
| JP | 2002-84383 | 3/2002 |
| JP | 2002-312052 | 10/2002 |
| JP | 2003-067071 | 3/2003 |

* cited by examiner

*Primary Examiner*—Tim T. Vo
*Assistant Examiner*—Jay A Morrison
(74) *Attorney, Agent, or Firm*—Oblon, Spivak, McClelland, Maier & Neustadt, L.L.P.

(57) ABSTRACT

A file creation method creates a program-addition file for adding a program to a program-initiation recording medium of an information processing apparatus. The file creation method comprises the steps of acquiring identification information of the program-initiation recording medium, and creating a program-addition file in response to the identification information so that starting of the program on the information processing apparatus is allowed by the program-addition file with the program stored in the program-initiation recording medium.

19 Claims, 17 Drawing Sheets

```
┌─────────────────────┐ ,-130
│                     │
│       ROM           │
│     MONITOR         │
│                     │
└──────────┬──────────┘
           │
┌──────────┴──────────┐ ,-131
│                     │
│     PROGRAM         │
│  INITIATING UNIT    │
│                     │
└─────────────────────┘
```

FIG.8A

```
REQ. APPL. CHOICE         _ □ ☒
┌─────────────────────────────┐
│ USER ID    [          ]     │
│ PASSWORD   [          ]     │
│ APPL.                       │
│ CHOICE     [         ▼]     │
└─────────────────────────────┘
```

FIG.8B

```
REQ. APPL. CHOICE         _ □ ☒
┌─────────────────────────────┐
│ MODEL                       │
│ NAME       [          ]     │
│ DATE OF                     │
│ PURCHASE   [          ]     │
│ APPL.                       │
│ CHOICE     [         ▼]     │
└─────────────────────────────┘
```

FIG.8C

```
REQ. APPL. CHOICE         _ □ ☒
┌─────────────────────────────┐
│ MODEL ID   [          ]     │
│ APPL.                       │
│ CHOICE     [         ▼]     │
└─────────────────────────────┘
```

FIG.8D

| DETAILS OF REQ. APPL. CHOICE | _ □ ☒ |
|---|---|
| REQ. APPL. NAME | PRINTER APPL. |

SELECT ONE OF FOLLOWING MODEL IDs

| MODEL ID | A00-01234567 |
|---|---|
|  | B12-34567890 |
|  | CDE-00000000 |
|  |  |
|  |  |

FIG.13

```
PLURAL LOCATIONS FOR APPL. ADDITION EXIST.
  SELECT ONE OF THE LOCATIONS
                                    | APPLICATION DIMM |
                                    | APPLICATION SD |
```

FIG.14 init.d/
　　apl.cnf
　　apl.lic module/
　　apl.mod
　　apl.mac

FILE CREATION METHOD, SERVER, COMPUTER TERMINAL, RECORDING MEDIUM, INFORMATION PROCESSING APPARATUS, AND PROGRAM ADDITION SYSTEM

BACKGROUND OF THE INVENTION

1. Field of the Invention

The present invention generally relates to a file creation method, a server, a computer terminal, a recording medium, an information processing apparatus and a program addition system, and more specifically to a file creation method, a server, a computer terminal, a recording medium, an information processing apparatus and a program addition system, which are configured to add a program to a program initiating recording medium.

2. Description of the Related Art

An information processing apparatus, such as a personal computer, carries out various kinds of information processing by performing one or more programs corresponding to respective information processing procedures.

Moreover, an image forming apparatus (for example, a multi-function peripheral system), which is an application example of the information processing apparatus, is provided with the display unit, the printing unit, the image pickup unit, etc., which are accommodated in a single housing, in addition to the four kinds of programs corresponding to the printer, the copier, the facsimile, and the scanner, respectively. By selecting one of the programs, the multi-function peripheral system is operated as the selected one of the printer, the copier, the facsimile, and the scanner.

Japanese Laid-Open Patent Application No. 2002-084383 discloses an example of the multi-function peripheral system mentioned above.

Upon power-up of the multi-function peripheral system or the like, the BIOS (basic input/output system) and the boot loader are started. The boot loader expands the operating system (OS) and the root file system on the RAM (random access memory), and initiates the OS. The OS mounts the root file system. The "mounting" herein means that a file system, a peripheral device, etc. are started so that the file system or peripheral device can be accessed by another system or device.

After the startup of the OS, the bootstrap which starts an application program (which is called the application) is started. The bootstrap is a process which is first started by the information processing apparatus or the multi-function peripheral system.

The bootstrap mounts the file system according to a predetermined configuration file. The bootstrap starts the program, which is required for operation of the information processing apparatus or the multi-function peripheral system and recorded in a program-initiation recording medium, such as a hard disk drive (HDD) or a SD (secure digital) card, according to the predetermined configuration file.

In recent years, there is an increasing demand for a program addition system that can easily add a new program for use in the information processing apparatus or the multi-function peripheral system to the program-initiation recording medium mentioned above.

The addition of a new program to the above-mentioned program-initiation recording medium may be carried out through the network, such as the Internet or a LAN. Moreover, the addition of a new program to the program-initiation recording medium may be carried out by using an SD card which is a detachable recording medium the insertion and removal of which is possible.

The user can make use of the program which is added to the program-initiation recording medium, in any information processing apparatus or multi-function peripheral system. Hence, there is a possibility that the program may be illegally added to a program-initiation recording medium which is provided in the information processing apparatus or the multi-function peripheral system which is not authorized to add the program thereto.

Moreover, when a program is added to a program-initiation recording medium using a detachable program-addition recording medium, such as an SD card, the insertion and removal of which is possible, the program recorded in the program-addition recording medium can be also used with any information processing apparatus or multi-function peripheral system. There is also a possibility that the program may be illegally added to a program-initiation recording medium which is provided in the information processing apparatus or the multi-function peripheral system which is not authorized to add the program thereto.

Therefore, when adding the program to the program-initiation recording medium of the information processing apparatus or the multi-function peripheral system, the provision of a mechanism for preventing the program added to the program-initiation recording medium from being illegally used is demanded, in order to establish the security of the program.

SUMMARY OF THE INVENTION

An object of the present invention is to provide an improved file creation method in which the above-described problems are eliminated.

Another object of the present invention is to provide a file creation method which creates a program-addition file on a recording medium in response to identification information of a program-initiation recording medium, in order to prevent the illegal use of a program added to the program-initiation recording medium and establish the security of the program added thereto.

Another object of the present invention is to provide a server which creates a program-addition file on a recording medium in response to identification information of a program-initiation recording medium, in order to prevent the illegal use of a program added to the program-initiation recording medium and establish the security of the program added thereto.

Another object of the present invention is to provide a computer terminal which creates a program-addition file on a recording medium in response to identification information of a program-initiation recording medium, in order to prevent the illegal use of a program added to the program-initiation recording medium and establish the security of the program added thereto.

Another object of the present invention is to provide an information processing apparatus which creates a program-addition file on a recording medium in response to identification information of a program-initiation recording medium, in order to prevent the illegal use of a program added to the program-initiation recording medium and establish the security of the program added thereto.

Another object of the present invention is to provide a computer-readable recording medium which creates a program-addition file on a recording medium in response to identification information of a program-initiation recording medium, in order to prevent the illegal use of a program added to the program-initiation recording medium and establish the security of the program added thereto.

Another object of the present invention is to provide a program addition system which creates a program-addition file on a recording medium in response to identification information of a program-initiation recording medium, in order to prevent the illegal use of a program added to the program-initiation recording medium and establish the security of the program added thereto.

The above-mentioned objects of the present invention are achieved by a file creation method which creates a program-addition file for adding a program to a program-initiation recording medium of an information processing apparatus, the method comprising the steps of: acquiring identification information of the program-initiation recording medium; and creating a program-addition file in response to the identification information so that starting of the program on the information processing apparatus is allowed by the program-addition file with the program stored in the program-initiation recording medium.

The above-mentioned objects of the present invention are achieved by a server which creates a program-addition file for adding a program to a program-initiation recording medium of an information processing apparatus, the server comprising: an identification-information acquisition unit acquiring identification information of the program-initiation recording medium; and a file creation unit creating a program-addition file in response to the identification information, so that starting of the program on the information processing apparatus is allowed by the program-addition file with the program stored in the program-initiation recording medium.

The above-mentioned objects of the present invention are achieved by a computer terminal which stores a program-addition file in a program-addition recording medium, the program-addition file being used to add a program to a program-initiation recording medium of an information processing apparatus, the computer terminal comprising: an information transmitting unit transmitting, to a server, information required to acquire identification information of the program-initiation recording medium; a file receiving unit receiving, from the server, a program-addition file which is created by the server in response to the identification information so that starting of the program on the information processing apparatus is allowed by the program-addition file with the program stored in the program-initiation recording medium; and a file storing unit storing the received program-addition file into the program-addition recording medium.

The above-mentioned objects of the present invention are achieved by a computer-readable recording medium storing a program embodied therein for causing a computer to execute a file creation method which creates a program-addition file for adding a program to a program-initiation recording medium of an information processing apparatus, the file creation method comprising: acquiring identification information of the program-initiation recording medium; and creating a program-addition file in response to the identification information so that starting of the program on the information processing apparatus is allowed by the program-addition file with the program stored in the program-initiation recording medium.

The above-mentioned objects of the present invention are achieved by an information processing apparatus which adds a program to a program-initiation recording medium by using a program-addition recording medium in which a program-addition file for adding the program to the program-initiation recording medium is stored, the information processing apparatus comprising: a recording-medium detection unit detecting the program-addition recording medium in which the program-addition file is recorded; and a program addition unit performing an authentication check of the program-addition file read from the program-addition recording medium, and adding the program to the program-initiation recording medium according to a result of the authentication check.

The above-mentioned objects of the present invention are achieved by a program addition system comprising: a server which creates a program-addition file for being stored in a program-addition recording medium; and an information processing apparatus which adds a program to a program-initiation recording medium by using the program-addition recording medium, wherein the server is configured to acquire identification information of the program-initiation recording medium, and to create a program-addition file in response to the identification information, so that starting of the program on the information processing apparatus is allowed by the program-addition file with the program stored in the program-initiation recording medium, wherein the information processing apparatus is configured to detect the program-addition recording medium in which the program-addition file is recorded, to perform an authentication check of the program-addition file read from the program-addition recording medium, and to add the program to the program-initiation recording medium according to a result of the authentication check.

The above-mentioned objects of the present invention are achieved by a program addition system comprising: a server which creates a program-addition file for being stored in a program-addition recording medium; and an information processing apparatus which adds a program to a program-initiation recording medium by using the program-addition recording medium, wherein the server is configured to acquire identification information of the program-initiation recording medium, and to create a program-addition file in response to the identification information, so that starting of the program on the information processing apparatus is allowed by the program-addition file with the program stored in the program-initiation recording medium, wherein the information processing apparatus is configured to receive the program-addition file from the server, to perform an authentication check of the received program-addition file, and to add the program to the program-initiation recording medium according to a result of the authentication check.

According to the present invention, the program-addition file is created in response to the medium identification information so that starting of the program on the information processing apparatus is allowed by the program-addition file with the program stored in the program-initiation recording medium. Starting of the program on the information processing apparatus is not allowed with a program stored in a different program-initiation recording medium. Therefore, it is possible to prevent the illegal use of a program added to the program-initiation recording medium and establish the security of the program added thereto.

BRIEF DESCRIPTION OF THE DRAWINGS

Other objects, features and advantages of the present invention will be apparent from the following detailed description when reading in conjunction with the accompanying drawings.

FIG. 5 is a block diagram of an embodiment of a MFP booting unit in the multi-function peripheral system of FIG. 3.

FIG. 8A, FIG. 8B, FIG. 8C and FIG. 8D are diagrams of examples of the screen displayed on the display device of the computer terminal.

FIG. 13 is a diagram of an example of the program-addition location selection screen.

FIG. 14 is a diagram of an example of the program-initiation SD card to which the program is added.

DETAILED DESCRIPTION OF PREFERRED EMBODIMENTS

A description will now be given of the preferred embodiments of the invention with reference to the accompanying drawings.

Figure 1:
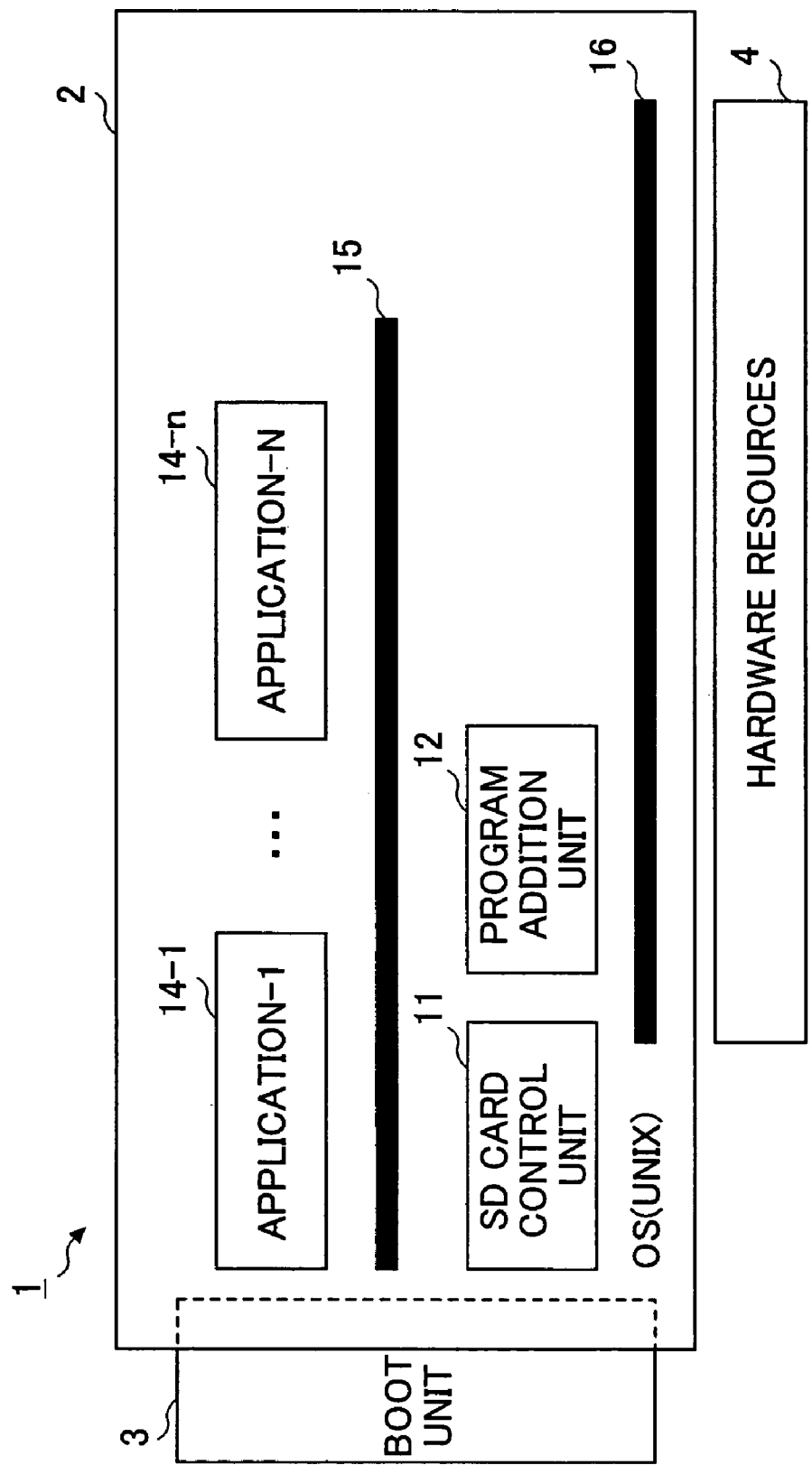
FIG. 1 is a block diagram of an embodiment of the information processing apparatus of the invention.

FIG. 1 is a block diagram of an embodiment of the information processing apparatus of the present invention.

The information processing apparatus 1 is constituted so that the software group 2, the boot unit 3, and the hardware resources 4 may be included.

The boot unit 3 is first activated upon power-up of the information processing apparatus 1, and starts the program initiating unit which is described later.

The program initiating unit starts the software group 2 of the information processing apparatus 1.

Moreover, the program initiating unit reads the programs of the SD card control unit 11, the program addition unit 12, the applications 14-1 to 14-n from the auxiliary memory device or the SD card, etc., and transmits each program to the memory device so that it starts the program. Hereinafter, the applications mean the application programs which are executed on the OS (operating system), and such programs or the application programs may also be called the applications.

The hardware resources 4 comprise the hardware resources, including the input device, the display device, the auxiliary memory device, the memory device, the interface device, and the SD-card slot.

Moreover, the software group 2 includes the programs of the SD card control unit 11, the program addition unit 12, and the applications 14-1 to 14-n, which are started on the OS, such as UNIX (registered trademark).

The OS carries out parallel execution of the programs (or the applications) of the SD card control unit 11, the program addition unit 12 and the applications 14-1 to 14-n, as the processes on the OS.

The API (application program interface) 15 is used for the pre-defined function to receive the request from the applications 14-1 to 14-n. The engine I/F 16 is used for the pre-defined function to transmit the request to the hardware resources 4.

In addition, the SD card control unit 11, the program addition unit 12, and the program initiating unit will be described later.

Next, a description will be given of a hardware composition of the information processing apparatus 1 of FIG. 1.

Figure 2:
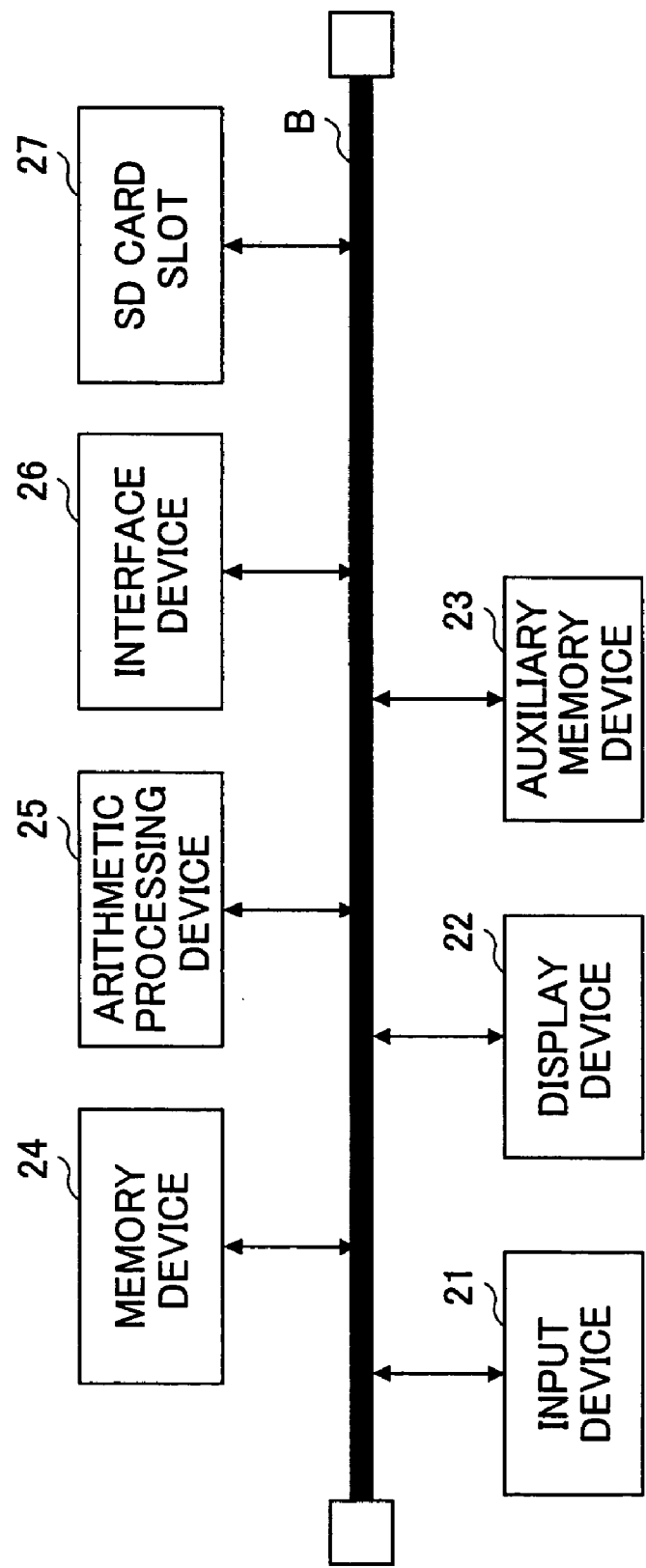
FIG. 2 is a block diagram of a hardware composition of the information processing apparatus of FIG. 1.

FIG. 2 shows a hardware composition of the information processing apparatus 1 of the present invention.

The information processing apparatus 1 of FIG. 2 is constituted so that the input device 21, the display device 22, the auxiliary memory device 23, the memory device 24, the arithmetic processing device 25, the interface device 26, and the SD card slot 27, which are interconnected by the bus B, may be included.

The input device 21 includes the keyboard, the mouse, etc., and it is used by the operator to input various operational instructions. The display device 22 displays various operational data and windows which are required for the operations.

The interface device 26 provides the interfaces for connecting the information processing apparatus 1 to the network or the computer terminal, and includes the modem, the router, or the devices according to various interface specifications.

The insertion and removal of the SD card is possible with respect to the SD card slot 27. An interrupt signal, which is generated in response to the insertion or removal of the SD card, is transmitted to the SD card control unit from the SD card slot 27.

The auxiliary memory device 23 stores various files, data, etc. The SD card inserted in the SD card slot 27 and the auxiliary memory device 23 store the programs of the SD card control unit 11, the program addition unit 12, the applications 14-1 to 14-n, which are related to the processing of the information processing apparatus 1, and store various files, data, etc. required for the program processing.

The memory device 24 stores the programs, which are read from the SD card control unit 11, the program addition unit 12, and the applications 14-1 to 14-n, from the SD card inserted in the SD card slot 27, and the auxiliary memory device 23, etc. at the time of starting of the information processing apparatus 1.

The arithmetic processing unit 25 performs arithmetic processing according to the programs of the SD card control unit 11, the program addition unit 12 and the applications 14-1 to 14-n, which are stored in the memory device 24.

Next, a description will be given of the composition of the multi-function-peripheral system 31 as an application example of the information processing apparatus 1 of the invention.

The following description will be focused on the composition of the multi-function peripheral system 31. However, the same is applicable to the composition of the information processing apparatus 1 of the invention.

The image forming apparatus in the present embodiment is provided with the respective functions of image forming modules, such as the printer, the copier, the facsimile, and the scanner, which are contained in one housing of the apparatus, and the image forming apparatus will be called the multi-function peripheral system (MFP).

The multi-function peripheral system (MFP) includes the display unit, the printing unit, the image reading unit, etc. in a single housing, and is provided with the four kinds of software (application programs) corresponding to the printer, the copier, the facsimile, and the scanner, respectively. By selecting one of these applications, and the MFP is operated as the selected one of the printer, the copier, the facsimile, and the scanner.

Figure 3:
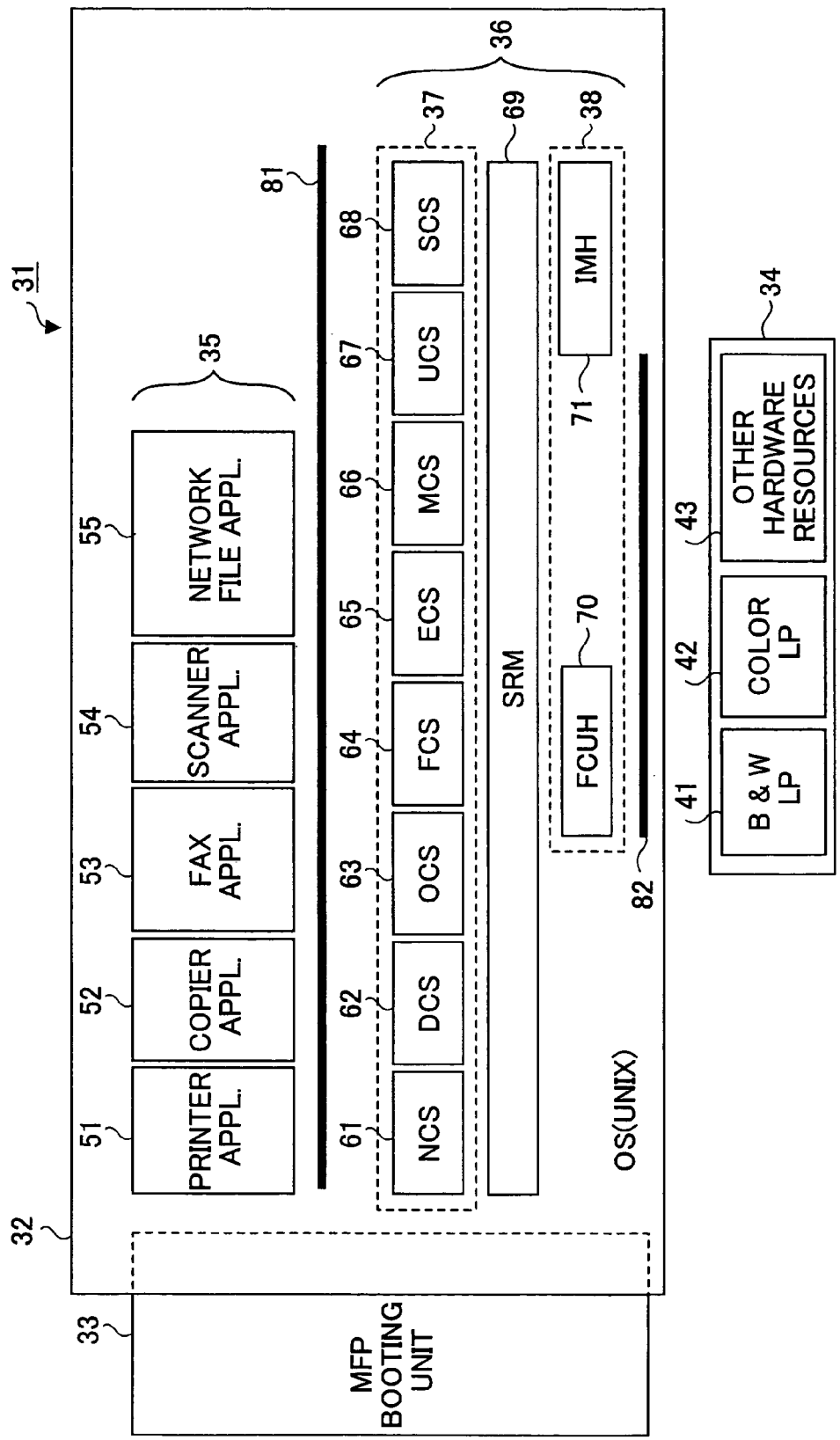
FIG. 3 is a block diagram of an embodiment of the multi-function peripheral system of the invention.

FIG. 3 is a block diagram of an embodiment of the multi-function peripheral system of the invention.

As shown in FIG. 3, the multi-function peripheral system (MFP) 31 is constituted so that the software group 32, the MFP boot unit 33, and the hardware resources 34 are included.

The MFP boot unit 33 is activated upon power-up of the multi-function peripheral system 31, and starts execution of the application layer 35 and the platform 36 in the software group 32.

For example, the MFP boot unit 33 reads the programs of the application layer 35 and the platform 36 from the hard disk drive (HDD) etc., transfers each read program to the memory storage, and starts the execution thereof.

The hardware resources 34 include the monochrome laser beam printer (B&W LP) 41, the color laser printer (Color LP) 42, and other hardware resources 43, such as the scanner and the facsimile.

The software group 32 includes the application layer 35 and the platform 36 which are operated on the operating system (OS), such as UNIX (registered trademark).

The application layer 35 includes the programs which perform processing specific to the respective user services related to the image formation, such as the printer, the copier, the facsimile, and the scanner. Specifically, the application layer 35 includes the printer application 51, the copier application 52, the fax application 53, the scanner application 54, and the network file application 55.

The platform 36 includes the control service layer 37, the system resource manager (SRM) 69, and the handler layer 38. The control service layer 37 interprets the processing request from the application layer 35, and generates the acquisition request to the hardware resources 34. The SRM 69 manages one or more hardware resources 34, and arbitrates the acquisition request from the control service layer 37. The handler layer 38 manages the hardware resources 34 according to the acquisition request from SRM 69.

The control service layer 37 is constituted to include one or more service modules therein. Specifically, the control service layer 37 includes the network control service (NCS) 61, the delivery control service (DCS) 62, the operation panel control service (OCS) 63, the facsimile control service (FCS) 64, the engine control service (ECS) 65, the memory control service (MCS) 66, the user information control service (UCS) 67, and the system control service (SCS) 68.

In addition, the platform 36 is constituted with the pre-defined functions so that the application program interface (API) 81 which receives a processing request from the application layer 35 is included. The operating system (OS) carries out parallel execution of the applications of the application layer 35 and the platform 36 as processes thereon.

The process of NCS 61 acts as the agent that distributes the data received from the network through the corresponding protocol over the applications, and transmits the data from the applications to the network through the corresponding protocol. For example, the process of NCS 61 controls data communications of HTTP (hypertext transfer protocol) between the MFP and the clients connected via the network, by using HTTPD (hypertext transfer protocol daemon).

The process of DCS 62 controls delivery of the accumulated documents etc. The process of OCS 63 controls operation of the operation panel. The process of FCS 64 provides the application program interface for performing the facsimile transmission and reception using the PSTN or ISDN network from the application layer 35, the registration/retrieval of various facsimile data managed with the backup memory, the facsimile reading, the facsimile reception and printing, etc.

The process of ECS 65 controls the engine units, such as the monochrome laser beam printer 41, the color laser printer 42, and the other hardware resources 43. The process of MCS 66 performs memory control of the memory acquisition and releasing, the use of HDD, the compression and expansion of image data, etc. The process of UCS 67 manages user information. The process of SCS 68 controls the application management, the operation panel control, the system monitor displaying, the LED monitor displaying, the hardware-resources management, the interrupted application control, etc.

The process of SRM 69 carries out the system control and the management of the hardware resources 34 associated with SCS 68. For example, the process of SRM 69 arbitrates the acquisition requests from the upper layer to use the hardware resources 34, such as the monochrome laser beam printer 31 and the color laser printer 32, and controls the execution thereof.

Specifically, the process of SRM 69 determines whether the hardware resources 34 can be used according to the acquisition request (or whether they are currently used according to another acquisition request). If the use of the hardware resources 34 is possible, the process of SRM 69 notifies the upper layer that the hardware resources 34 can be used according to the acquisition request.

Moreover, the process of SRM 69 performs scheduling of the use of the hardware resources 34 according to the acquisition request from the upper layer, and carries out the contents of the request (for example, the paper conveyance and the imaging operation by means of the printer engine, the memory reservation, the file generation, etc.) directly.

Moreover, the handler layer 38 includes the facsimile control unit handler (FCUH) 70 which manages the facsimile control unit (FCU), and the image memory handler (IMH) 71 which carries out the memory assignment of the process and the management of the memory assigned to the process.

SRM 69, FCUH 70, and IMH 71 perform the processing request to the hardware resources 34 by using the engine interface 82 which transmits the processing request to the hardware resources 34 with the pre-defined functions.

With the above-described composition of FIG. 3, the multi-function peripheral system 31 can carry out the intensive control of each processing commonly required by the respective applications on the platform 36.

Figure 4:
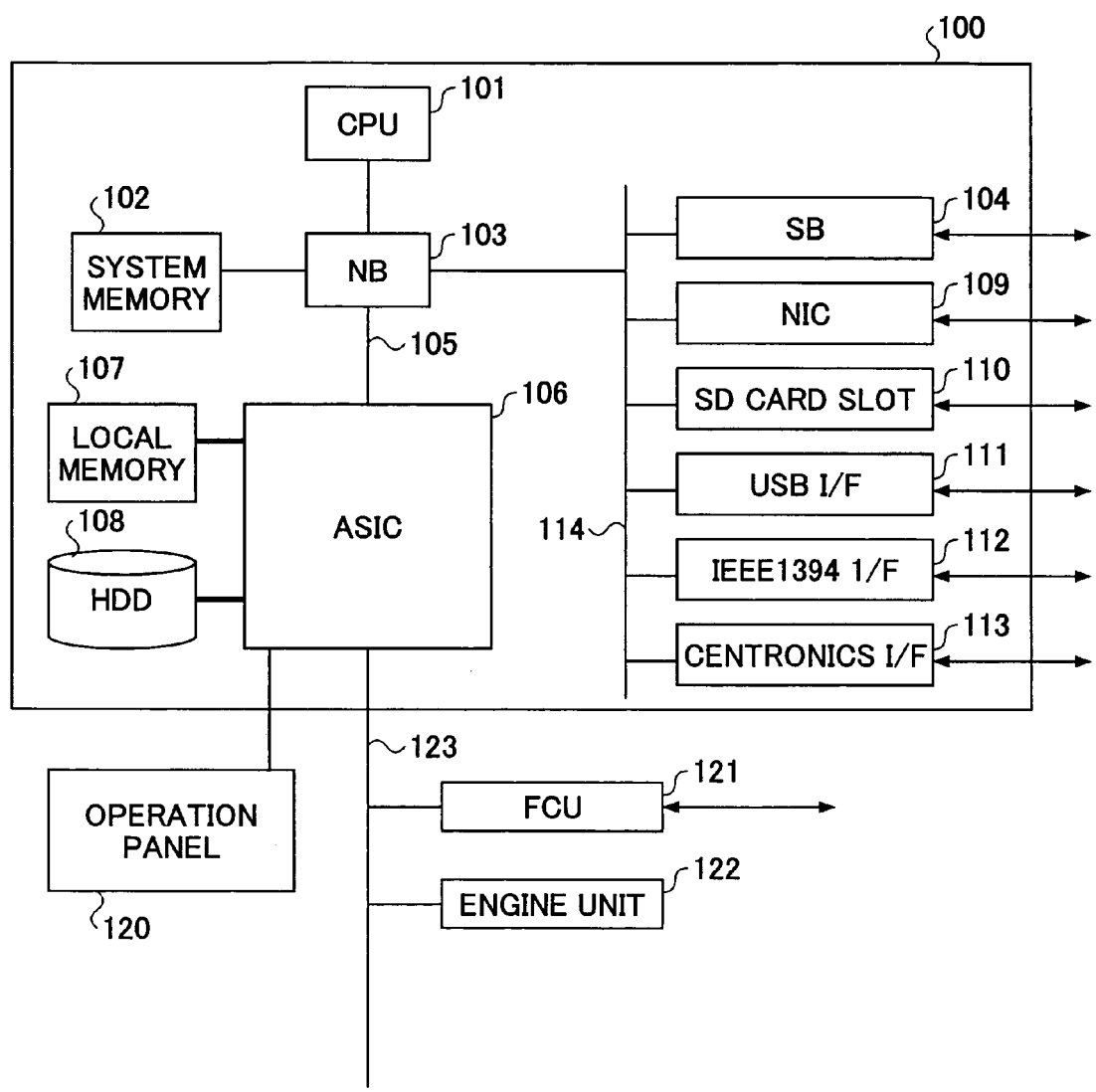
FIG. 4 is a block diagram of a hardware composition of the multi-function peripheral system of FIG. 3.

Next, a description will be given of the hardware configuration of the multi-function peripheral system 31 of the invention. FIG. 4 shows the hardware configuration of the multi-function peripheral system 31 of FIG. 3.

As shown in FIG. 4, the multi-function peripheral system 31 includes the controller 100, the operation panel 120, the facsimile control unit (FCU) 121, and the engine unit 122.

The controller 100 includes the CPU 101, the system memory 102, the north bridge (NB) 103, the south bridge (SB) 104, the application-specific integrated circuit (ASIC) 106, the local memory (LM) 107, the hard disk drive (HDD)

108, the network interface controller (NIC) 109, the SD card slot 110, the USB device 111, the IEEE1394 device 112, and the Centronics interface 113.

CPU 101 performs the control of the whole multi-function peripheral system 31. CPU 101 starts execution of NCS 61, DCS 62, OCS 63, FCS 64, ECS 65, MCS 66, UCS 67, SCS 68, SRM 69, FCUH 70, and IMH 71, and performs each process of the programs on the OS. Moreover, CPU 101 starts execution of the printer application 51, the copier application 52, the facsimile application 53, the scanner application 54, and the network file application, which constitute the application layer 35, and performs each process of the programs on the OS.

NB 103 is the bridge which is provided for interconnection of CPU 101, the system memory 102, SB 104, and ASIC 106. The system memory 102 is the memory which is used for image drawing of the multi-function peripheral system 31. SB 104 is the bridge which is provided for interconnection of NB 103, ROM (not shown), the PCI bus 114, and the peripheral devices.

The local memory 107 is the memory which is used as the image buffer for copying documents or the buffer for encoding images. ASIC 106 is the application-specific integrated circuit for image processing uses including the hardware for image processing. HDD 108 is the storage device for accumulating images, document data, programs, font data, forms, etc. The operation panel 120 is provided to display the operational messages to the operator and receive the input operational commands from the operator.

NIC 109 is the interface device for connecting the MFP 31 to the network. The SD card slot 110 is provided to allow the insertion and removable of the SD card, and the SC card slot 110 transmits an interrupt signal, generated in response to the insertion and removable of the SD card, to the SD card control unit. The USB device 111, the IEEE1394 device 112 and the Centronics interface 113 are the interface devices according to the respective interface specifications.

FIG. 5 is a block diagram of an example of the multi-function-peripheral system (MFP) booting unit of FIG. 3.

The multi-function-peripheral system (MFP) booting unit 33 comprises the ROM monitor 130 and the program initiating unit 131. As described above, the MFP booting unit 33 is first activated upon power-up of the multi-function peripheral system 31, and starts execution of the application layer 35 and the platform 36 in the software group 32.

The ROM monitor 130 which is the BIOS and boot loader is activated upon power-up of the MFP 31, and performs the initialization of the hardware, the diagnosis of the controller 100, the initialization of the software, etc.

The ROM monitor 130 expands the OS and the root file system on the system memory 102, and starts execution of the OS. The OS mounts the root file system.

Moreover, the program initiating unit 131 is called from the OS, and secures the memory areas on the system memory 102 and the LM 107.

The program initiating unit 131 is the process which is first initiated by the multi-function peripheral system 1, and mounts the file system according to a predetermined configuration file. Specifically, according to the predetermined configuration file, the program initiating unit 131 reads the programs of the application layer 35 and the platform 36, required for operation of the MFP 31, from the HDD 108, the SD card, the ROM, etc., and expands each read program to the memory areas which are secured on the system memory 102 and the LM 107, so that and the program initiating unit 131 starts the processes of the application layer 35 and the platform 36.

Next, a description will be given of processing of the program initiating unit 131.

The program initiating unit 131 reads a predetermined master configuration file at the time of starting, and performs mounting of the file system and starting of the processes according to the read master configuration file.

Moreover, the program initiating unit 131 performs mounting processing according to the description of the mounting, when the description of the mounting is included in the read master configuration file.

Furthermore, when the predetermined directory which includes the file of a predetermined extension in the root director of the file system mounted when the predetermined configuration file existed in the root of the mounted file system exists, the program initiating unit 131 reads the predetermined configuration file or the file of the predetermined extension, and performs mounting processing of the file system.

In addition, "gzromfs" is an example of the file system which can be mounted by the program initiating unit 131. This file system "gzromfs" manages the files of the ROMFS format which are "gzip" compression encoded.

Next, a description will be given of the preferred embodiments of the invention in which the processing to add a program to a program-initiation SD card (which is a program-initiation recording medium) is carried out.

Figure 6:
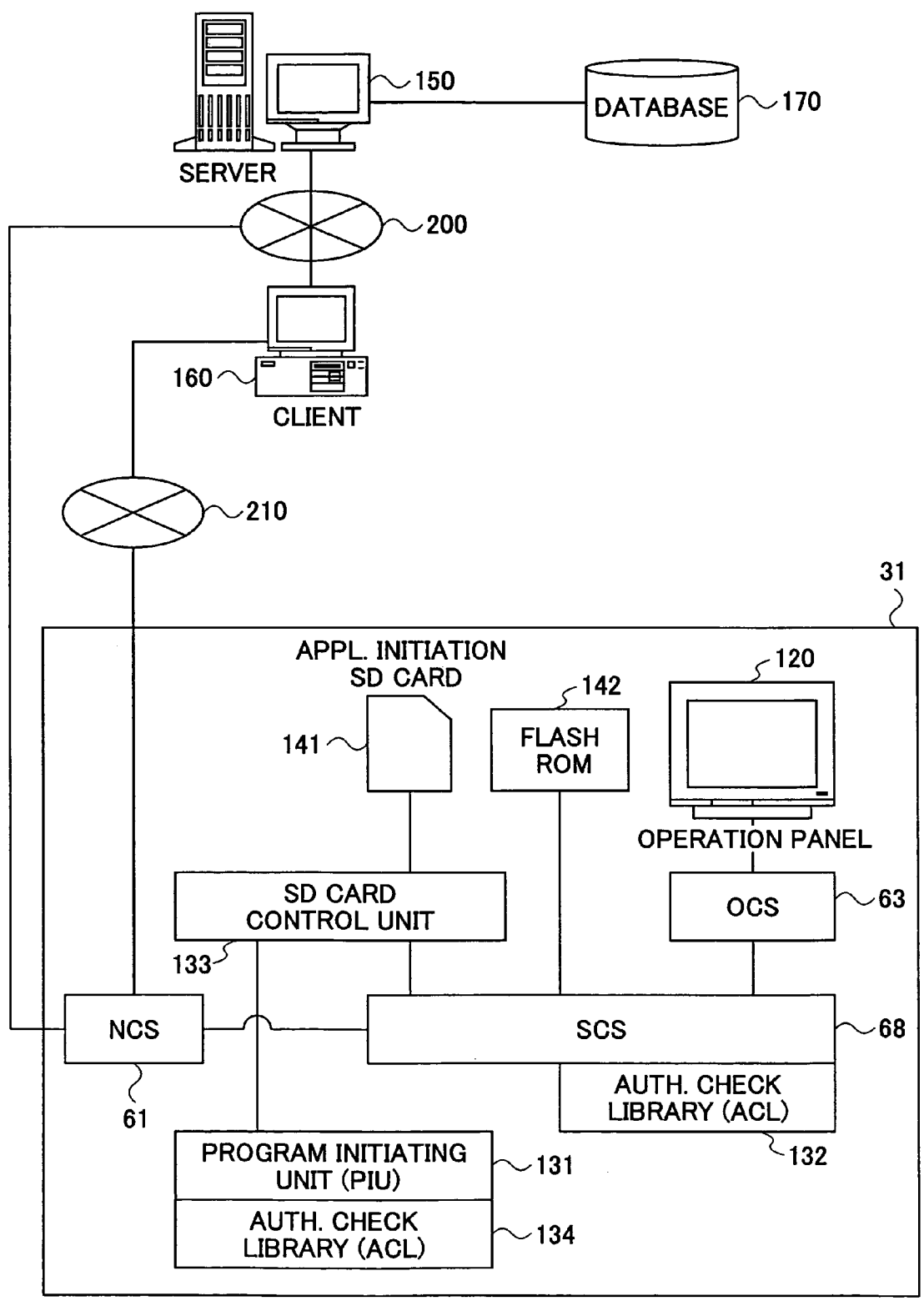
FIG. 6 is a diagram for explaining the processing to add a program to a program-initiation SD card by using a program-addition file.

The first preferred embodiment of the present invention will be explained. FIG. 6 is a diagram for explaining an embodiment of the processing to add a program to a program-initiation SD card by using a program-addition file.

In the following, only the composition required for description among the composition of the multi-function peripheral system 31 is shown in the diagram of FIG. 6, and the composition which is not required for description is omitted.

The multi-function peripheral system 31 is provided with the SD card slot 110 in which the program-initiation SD card 141 is inserted. The multi-function peripheral system 31 is connected to the computer terminal 160 through the network 210. Moreover, the multi-function peripheral system 31 is connected to the server 150 through the network 200. The multi-function peripheral system 31 carries out the processing to add the program to the program-initiation SD card 141 or the flash ROM 142 by using the program-addition file.

The server 150 is the device which creates the program-addition file used for adding the program to the program-initiation SD card 141. The server 150 creates the program-addition file based on the acquired information. The server 150 transmits the created program-addition file to the MFP 31 via the network 200, or to the computer terminal 160 via the network 210.

The computer terminal 160 is connected to the server 150 via the network 200. Moreover, the computer terminal 160 is connected to the multi-function peripheral system 31 via the network 210. The computer terminal 160 transmits information to the server 150 via the network 200, and transmits the program-addition file, received from the server 150, to the multi-function peripheral system 31 via the network 210.

Figure 7:
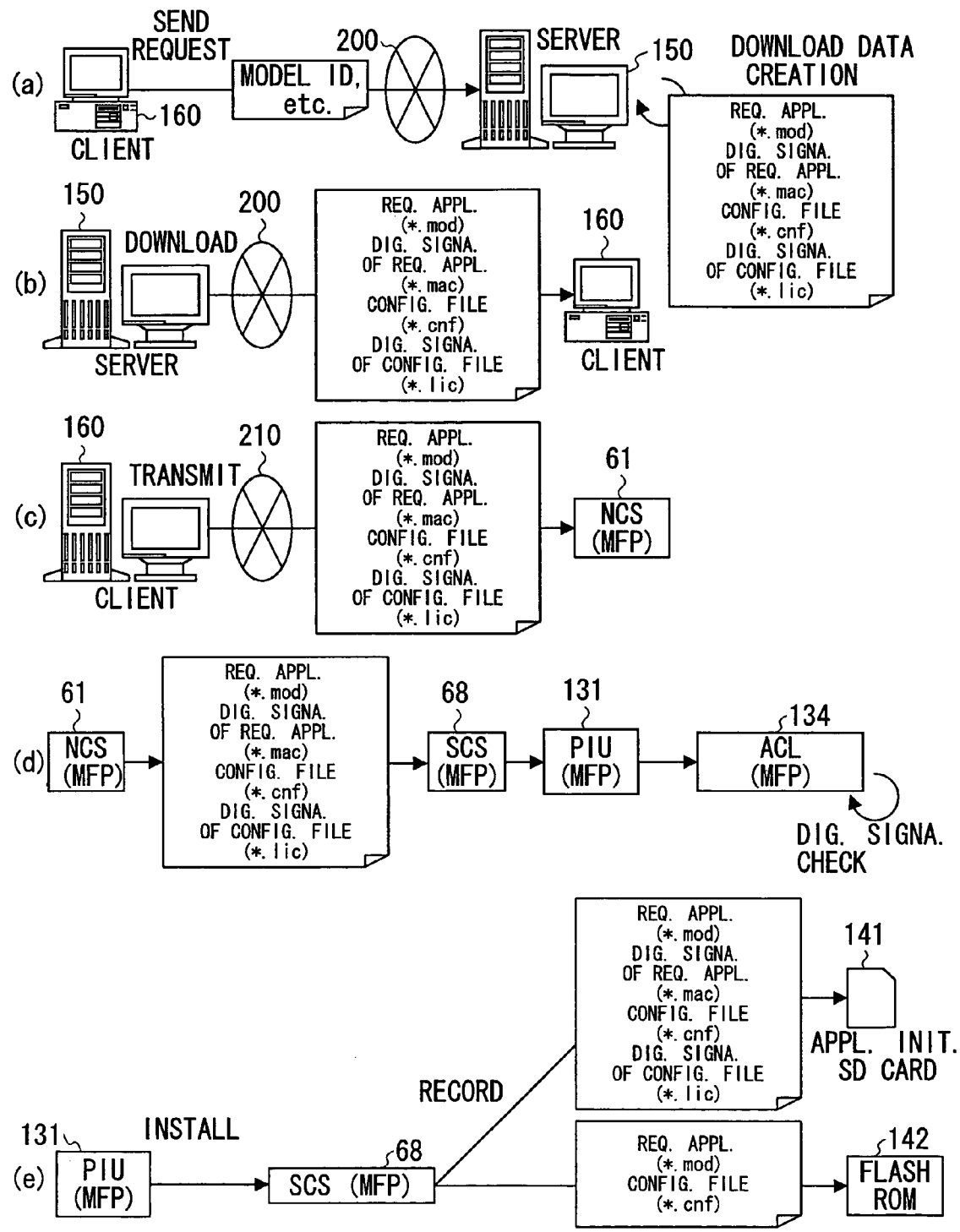
FIG. 7 is a diagram for explaining examples of processing of the multi-function peripheral system, the server, and the computer terminal.

Referring to FIG. 7, a description will be given of the processing of the multi-function peripheral system 31, the server 150, and the computer terminal 160, which are shown in FIG. 6.

FIG. 7 is a diagram for explaining examples of the processing of the multi-function peripheral system, the server, and the computer terminal. The examples of the processing of FIG. 7 are directed to the transmission of the program-addition file from the server 150 to the MFP 31 through the computer terminal 160.

In the processing of FIG. 7 (a), the information of the application program, which is desired by the operator who operates the computer terminal 160 to be added to the multi-function peripheral system 31, is sent to the server 150 as the name of the requesting application program.

The operator can transmit the information of the application to be added to the multi-function peripheral system 31, to the server 150 by using the screen shown in FIG. 8A to FIG. 8D displayed on the display device of the computer terminal 160.

FIG. 8A to FIG. 8D show examples of the screen displayed on the display device of the computer terminal 160.

The operator on the computer terminal 160 who desires to add the requesting application program to the multi-function peripheral system 31 starts the pre-installed application program in the computer terminal 160, and displays the application starting screen of FIG. 8A to FIG. 8C on the display device of the computer terminal 160.

In the screen of FIG. 8A, the user ID input item, the password input item, and the application selection column are included.

In the screen of FIG. 8B, the model name input item, the device purchase date input item, and the application selection column are included.

In the screen of FIG. 8C, the model ID input item and the application selection column are included.

If the operator operates the computer terminal 160 and inputs the information to any one screen of FIG. 8A to FIG. 8C, the input information will be transmitted to the server 150 from the computer terminal 160.

However, in the case of the screen of FIG. 8A, the identification information (for example, the model name, the model ID, etc.) for identifying the multi-function peripheral system 31 is not transmitted to the server 150.

Therefore, when there are two or more model IDs corresponding to the requesting application program, the computer terminal 160 displays the screen of FIG. 8D on the display device, so that the operator is requested to choose the desired model ID from among them.

Alternatively, the server 150 may display the screens of FIG. 8A to FIG. 8D on the display device of the server, which are displayed on the display device of the computer terminal 160 as in the above-described embodiment.

Figure 9:
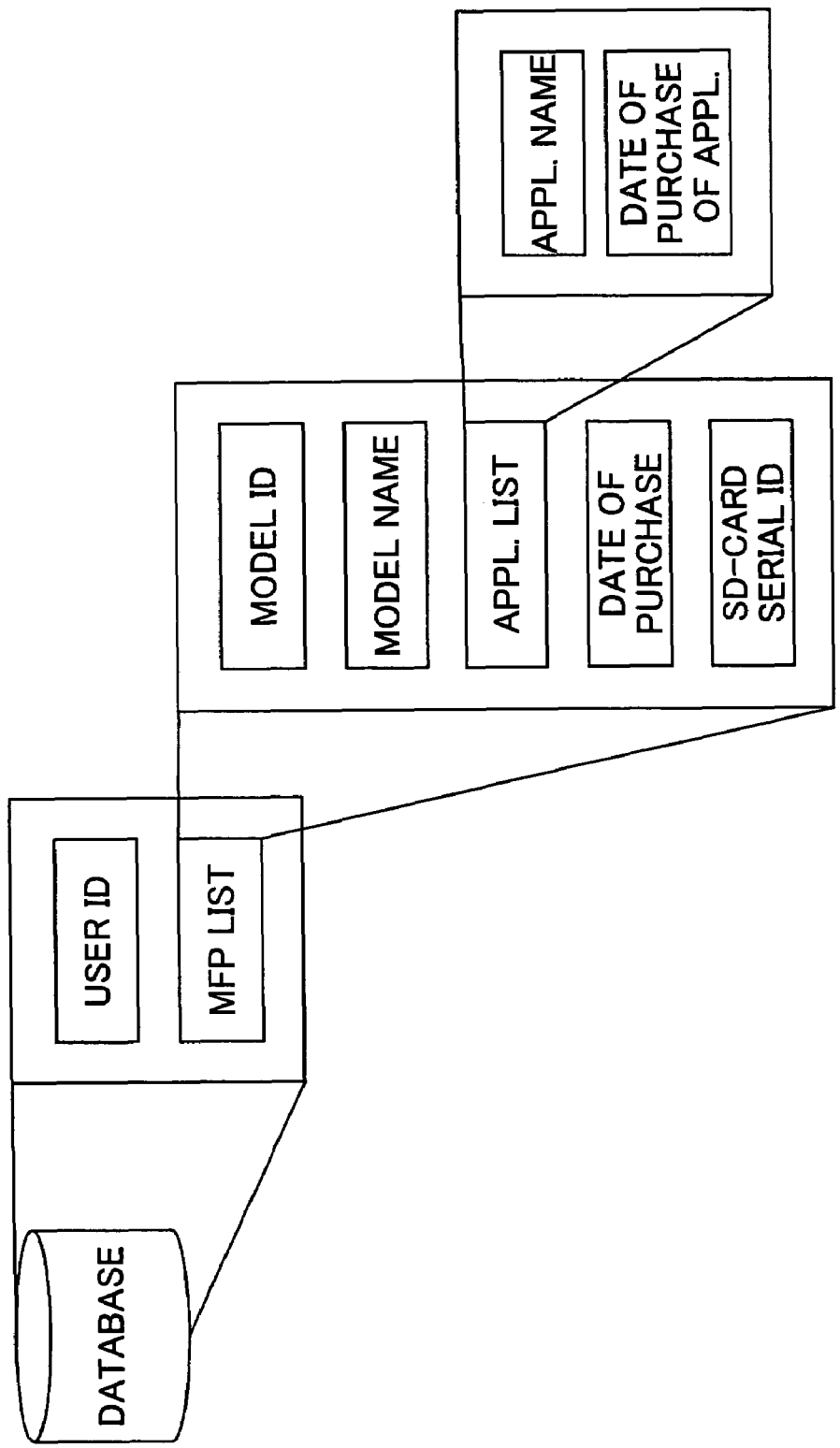
FIG. 9 is a block diagram of an example of the database provided in the server.

Referring back to FIG. 7 (a), the server 150 performs the user authentication based on both the information stored in the database 170 of FIG. 9 and the information received from the computer terminal 160. When the user authentication is completed normally, the program-addition file used for adding the program to the program-initiation SD card 141 is created.

FIG. 9 is a block diagram of an example of the database 170 provided in the server 150.

As shown in FIG. 9, the information stored in the database 170 includes the user ID, the MFP-system list, the model ID related with the multi-function peripheral system contained in the MFP-system list, the model name, the loaded application list, the purchase date, the serial ID (the SD serial ID) of the program-initiation SD card 141 installed in the MFP system, the application name related with the application program contained in the application list, and the purchase date of the application program.

In addition, the database 170 may store the newest information because it is cooperated with the system which receives the update information from one or more multi-function peripheral systems 31 at respective intervals of a predetermined time.

The server 150 receives, from the database 170, the SD serial ID of the program-initiation SD card 141 of the multi-function peripheral system 31 of concern.

Therefore, the acquisition of the SD serial ID can be easily carried out by the server 150 if each SD serial ID of one or more multi-function peripheral systems 31 is stored in the database 170.

Figure 10:
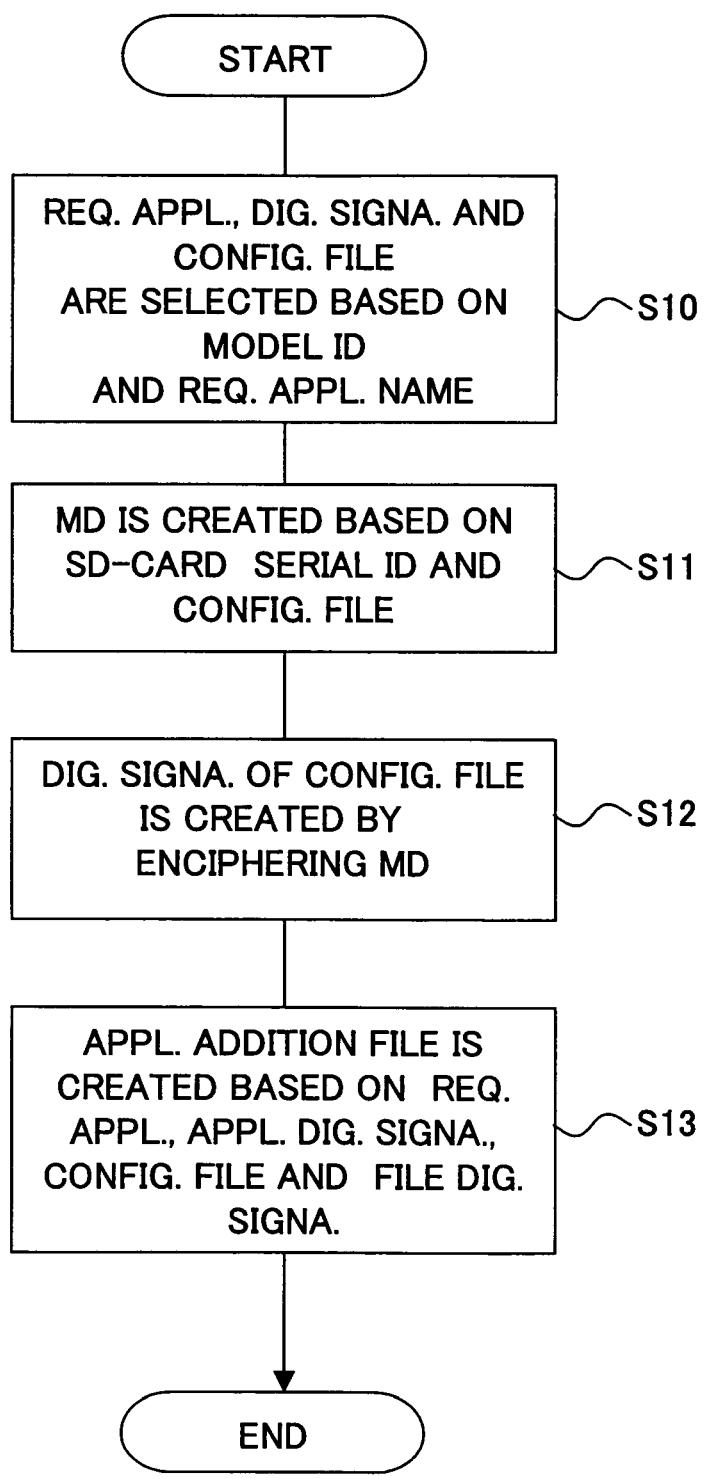
FIG. 10 is a flowchart for explaining an example of the processing to create a program-addition file.

The server 150 creates a program-addition file, which is required to add the program to the program-initiation SD card 141, as shown in FIG. 10.

FIG. 10 is a flowchart for explaining an example of the processing to create the program-addition file.

As shown in FIG. 10, the server 150 at step S10 selects the application program, the electronic signature of the application program, and the configuration file based on the model ID and the requested application name which the server 150 received from the computer terminal 160.

Progressing to step S11, the server 150 creates the MD (message digest) of the configuration file chosen at step S10 and the SD serial ID acquired from the database 170.

Progressing to step S12, the server 150 enciphers the MD created at step S11 with the private key, and creates the electronic signature of the configuration file.

Progressing to step S13, the server 150 creates the program-addition file based on the application program, the electronic signature of the application program, and the configuration file, which are chosen at step S10, and based on the electronic signature of the configuration file created at step S12.

Referring to FIG. 7 (b), the server 150 transmits the program-addition file to the computer terminal 160, the program-addition file including the application program, the electronic signature of the application program, the configuration file, and the electronic signature of the configuration file.

In the processing of FIG. 7 (c), the computer terminal 160 transmits the program-addition file, received from the server 150, to the NCS 61 of the multi-function peripheral system 31.

In the processing of FIG. 7 (d), the NCS 61 transmits the program-addition file to the program initiating unit 131 through the SCS 68.

The program initiating unit 131 performs the electronic authentication check of the requesting application program and the configuration file using the authentication check library 134, in order to check the justification of the received program-addition file. For example, the authentication check of the application program is performed as in the flowchart of FIG. 11.

Figure 11:
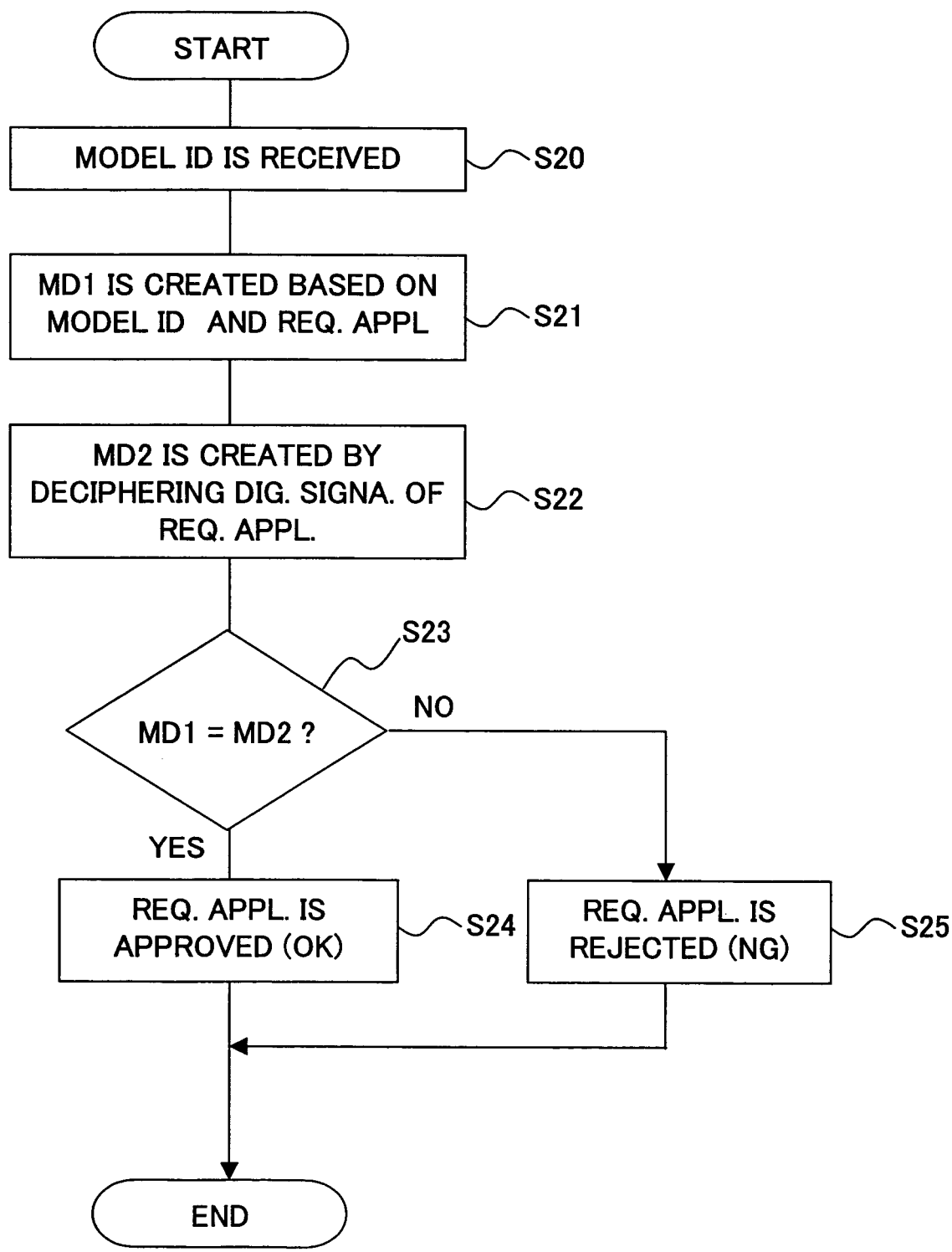
FIG. 11 is a flowchart for explaining an example of processing of the authentication check of the requested application program.

FIG. 11 is a flowchart from explaining an example of the processing of the authentication check of the requesting application program.

At step S20, the program initiating unit 131 acquires the model ID.

Progressing to step S21, the program initiating unit 131 creates the MD1 (message digest) based on the model ID acquired at step S20 and the application program included in the program-addition file.

Progressing to step S22, the program initiating unit 131 creates the MD2 (message digest) by deciphering the electronic signature of the application, contained in the program-addition file, with the public key.

Progressing to step S23, the program initiating unit 131 determines whether the MD1 and the MD2 are equal to each other.

If it is determined at step S23 that the MD1 and the MD2 are equal, the program initiating unit 131 at step S24 determines that the authentication check of the requesting application program is set to OK.

If it is determined at step S23 that the MD1 and the MD2 are not equal, the program initiating unit 131 at step S25 determines that the authentication check of the requesting application program is set to NG. This is because, if the MD1 and the MD2 are not equal, the possibility that the requesting application program included in the program-addition file is altered is considered high.

Figure 12:
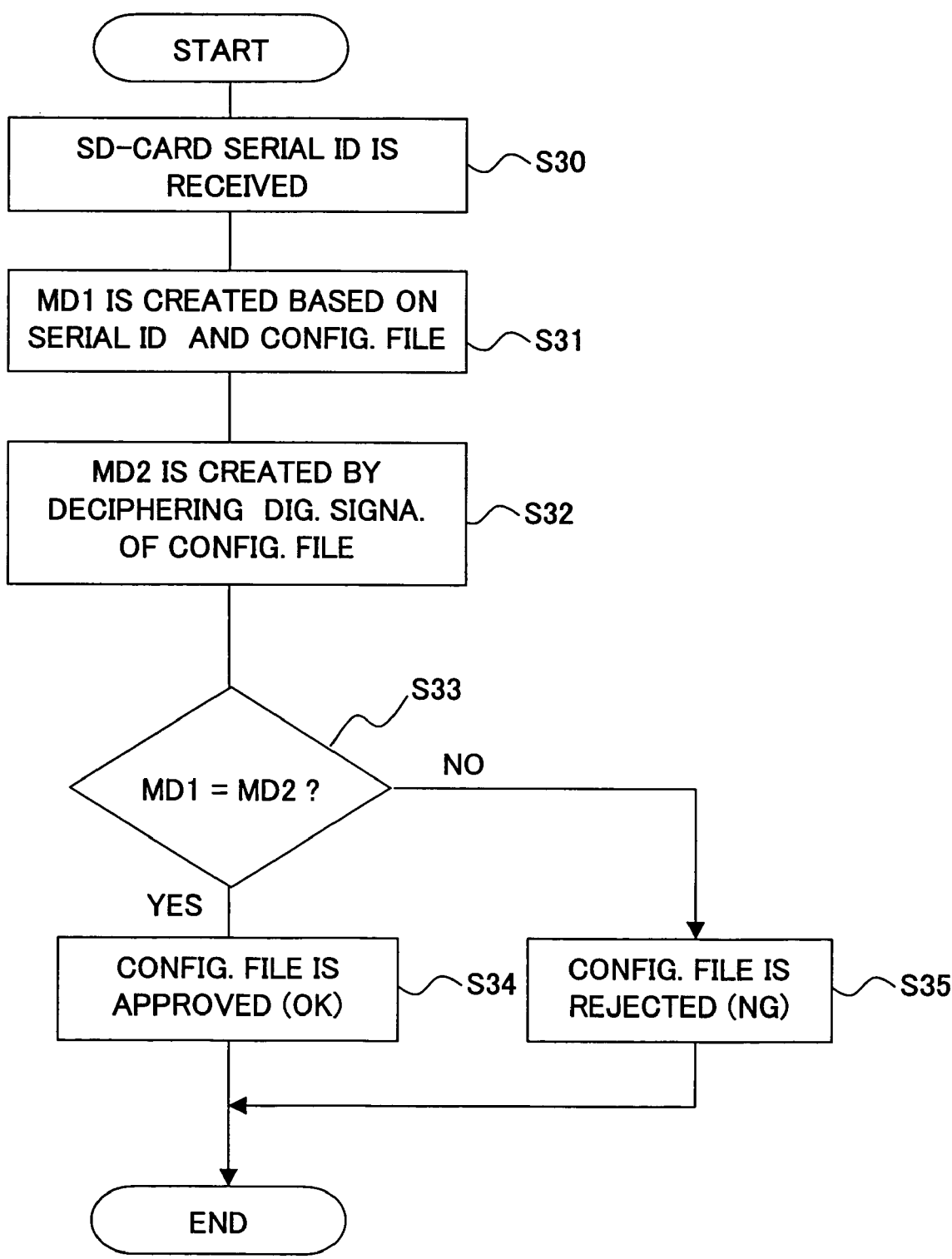
FIG. 12 is a flowchart for explaining an example of processing of the authentication check of the configuration file.

Moreover, the authentication check of the configuration file is performed by the program initiating unit 131 as in the flowchart of FIG. 12.

FIG. 12 shows an example of the processing of the authentication check of the configuration file.

At step S30, the program initiating unit 131 acquires the application SD serial ID from the program-initiation SD card 141.

Progressing to step S31, the program initiating unit 131 creates the MD1 based on the SD serial ID obtained at step S30 and the configuration file contained in the program-addition file.

Progressing step S32, the program initiating unit 131 creates the MD2 by deciphering the electronic signature of the configuration file, contained in the program-addition file, with the public key.

Progressing step S33, the program initiating unit 131 determines whether the MD1 and the MD2 are equal to each other.

If it is determined at step S33 that the MD1 and the MD2 are equal, the program initiating unit 131 at step S34 determines that the authentication check of the configuration file is set to OK.

If it is determined at step S33 that the MD1 and the MD2 are not equal, the program initiating unit 131 at step S35 that the authentication check of the configuration file is set to NG. This is because, if the MD1 and the MD2 are not equal, the possibility that the requesting application program included in the program-addition file is altered is considered high.

After the program initiating unit 131 checks the justification of the program-addition file, the control of the program initiating unit 131 is transferred to the processing of FIG. 7 (e).

In the processing of FIG. 7 (e), the program initiating unit 131 notifies the SCS 68 that the preparation to add the program is completed.

The SCS 68 writes a part or all of the program-addition file to the program-initiation SD card 141 or the flash ROM 142. In the present embodiment, according to the description of the configuration file, the SCS 68 is requested to write the program-addition file to either of the program-initiation SD card 141 or the flash ROM 142. Alternatively, the present embodiment may be modified so that the addition location selection screen as shown in FIG. 13 is displayed on the control panel 120, and the operator is requested to choose desired one from among the addition locations.

The addition location selection screen of FIG. 13 contains the character string in which the selection of the addition location is requested, and the selection button for choosing the desired addition location.

When the program-initiation SD card 141 is chosen by the operator as the addition location, the SCS 68 is caused to write the requesting application program, the electronic signature of the application program, the configuration file, and the electronic signature of the configuration file to the program-initiation SD card 141.

FIG. 14 shows an example of the program-initiation SD card in which the program is added.

In the example of FIG. 14, "apl.cnf" under the directory "init.d" indicates the configuration file, and "apl.lic" indicates the electronic signature file which is used for the authentication check of the configuration file. Moreover, "apl.mod" under the directory "module" indicates the requesting application program, and "apl.mac" indicates the electronic signature of the application program.

On the other hand, when the flash ROM 142 is chosen by the operator as the addition location, the SCS 68 is caused to write the requesting application program and the configuration file to the flash ROM 142. In starting of the program from the flash ROM 142, the electronic signature check is not performed. Hence, the writing of the electronic signature of the application program and the electronic signature of the configuration file to the flash ROM 142 is omitted in this case.

In the above examples of the processing of FIG. 7, the program-addition file is transmitted from the server 150 to the MFP 31 through the computer terminal 160. Alternatively, the program-addition file may be transmitted from the server 150 directly to the MFP 31 without using the computer terminal 160.

In such alternative embodiment, the processing of FIG. 7 (a) is carried out so that the operator who operates the MFP 31 or the server 150 inputs or transmits the information of the desired application program to be added to the MFP 31, to the server 150 as the name of the requesting application program. The operator can input or transmit the information of the application program to be added to the MFP 31, to the server 150 by using the screen shown in FIG. 8A to FIG. 8D displayed on the display device of the server 150 or the operation panel 120 of the MFP 31.

Moreover, in such alternative embodiment, the processing of FIG. 7 (b) or FIG. 7 (c) is carried out so that the server 150 transmits the program-addition file to the NCS 61 of the MFP 31 via the network 200, and the program-addition file including at least the application program, the electronic signature of the application program, the configuration file, and the electronic signature of the configuration file.

In any case, according to the processing of FIG. 7, the requesting application program, the electronic signature of the application program, the configuration file, and the electronic signature of the configuration file are downloaded via the network, and the program-initiation SD card 141 of FIG. 14 can be created easily.

In the case in which the program is started using the program-initiation SD card 141 of FIG. 14, the authentication checks of the application program and the configuration file are performed according to the processings of FIG. 11 and FIG. 12, and only the program whose justification has been confirmed, among those currently recorded in the program-initiation SD card 141, can be started safely.

A description will be given of the second preferred embodiment of the present invention.

Figure 15A:
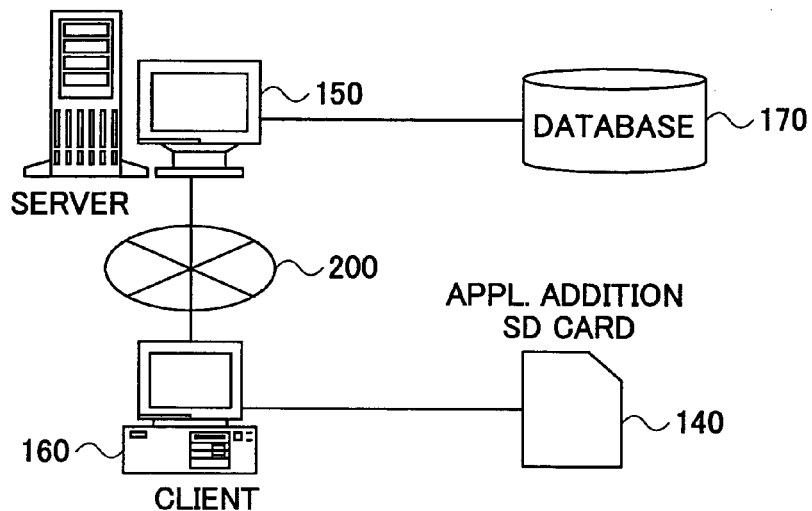
FIG. 15A and FIG. 15B are block diagrams for explaining an example of processing to add a program from the program-addition SD card to the program-initiation SD card.
Figure 15B:
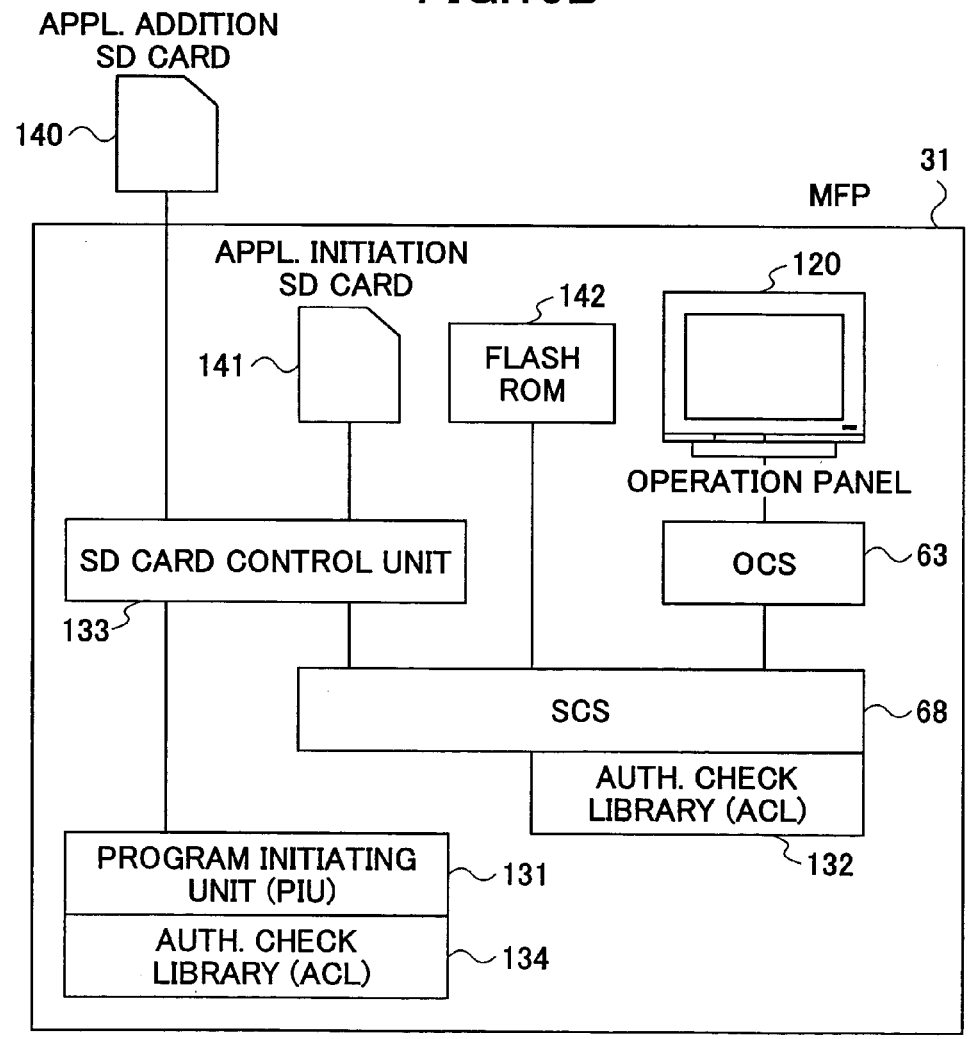

FIG. 15A and FIG. 15B show an example of the processing to add the application program of the program-addition SD card to the program-initiation SD card.

In the composition of FIG. 15A and FIG. 15B, only the elements of the multi-function peripheral system 31 required for description are illustrated, and the elements which do not need description are omitted.

As shown in FIG. 15B, the multi-function peripheral system 31 is provided with the program-addition SD card 140 inserted in the SD card slot 110. The multi-function peripheral system 31 is an information processing apparatus which adds the program to the program-initiation SD card 141 or the flash ROM 142 by using the program-addition SD card 140.

As shown in FIG. 15A, the server 150 is a device which creates the program-addition file for adding the program to the program-initiation SD card 141. The computer terminal 160 is connected to the server 150 through the network 200, such as the Internet or LAN.

The computer terminal 160 is provided with the SD card slot. The computer terminal 160 reads the information from the program-addition SD card 140 inserted in the SD card slot, and transmits the read information to the server 150 via the network 200. On the other hand, the computer terminal 160 receives the information from the server 150 via the network 200, and writes the received information to the program-addition SD card 140 inserted in the SD card slot.

Figure 16:
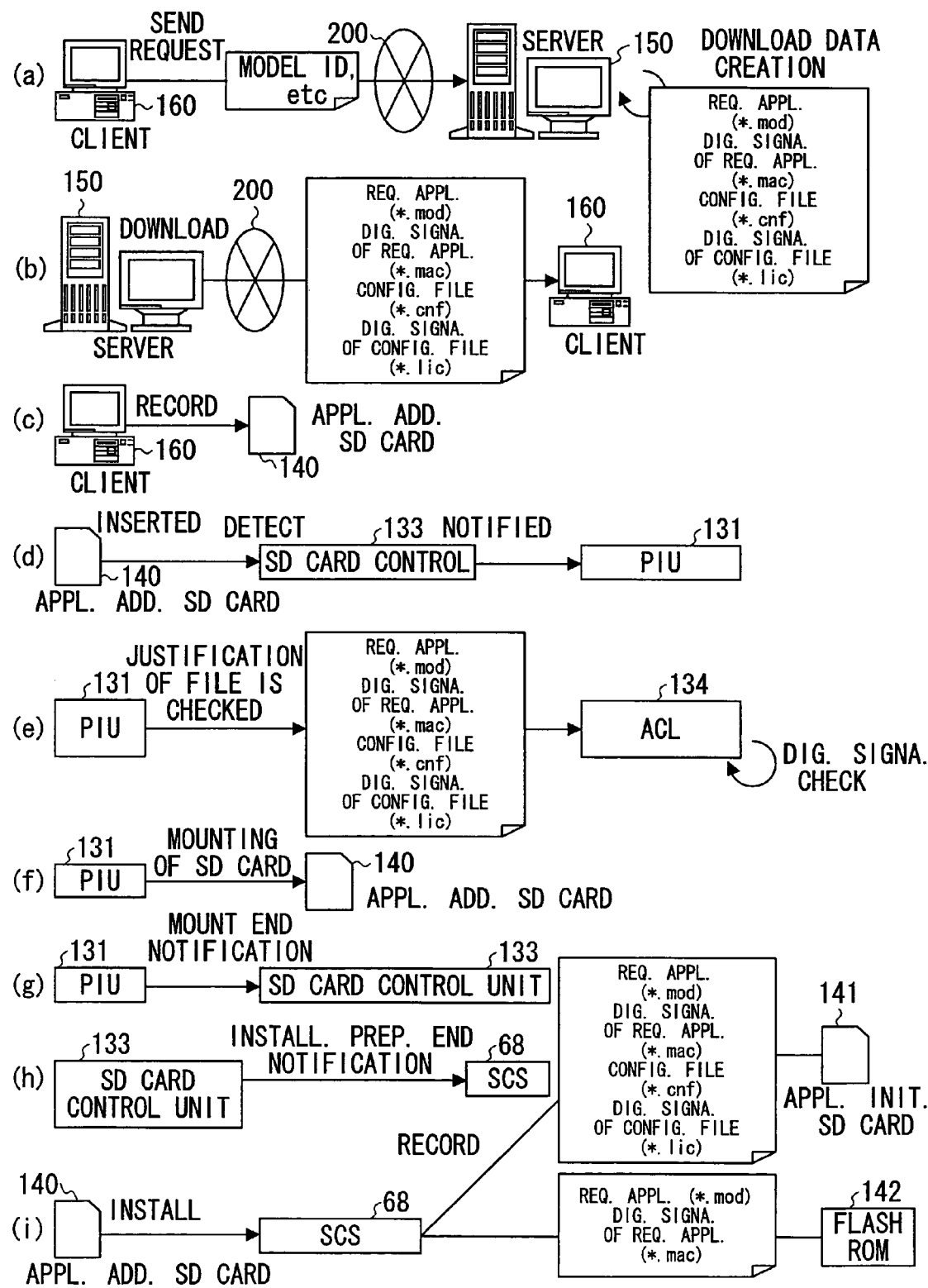
FIG. 16 is a diagram for explaining other examples of the processing of the multi-function peripheral system, the server, and the computer terminal.

Referring to FIG. 16, a description will be given of the processing of the multi-function peripheral system 31, the server 150, and the computer terminal 160 of FIG. 15A and FIG. 15B.

FIG. 16 shows another example of the processing of the multi-function peripheral system, the server, and the computer terminal.

In the processing of FIG. 16 (a), the operator who operates the computer terminal 160 transmits to the server 150 the information of the desired application program to be added to the multi-function peripheral system 31, as the name of the requesting application program.

The operator looks at one of the screens of FIG. 8A to FIG. 8C displayed on the display device of the computer terminal 160, and can transmit the information of the desired application program to be added to the multi-function peripheral system 31, to the server 150.

For example, the operator who desires to add the application program to the multi-function peripheral system 31 starts the dedicated application program pre-recorded in the computer terminal 160, so that any one of the screens of FIG. 8A to FIG. 8C is displayed on the display device of the computer terminal 160.

The computer terminal 160 automatically starts the dedicated application program when the program-addition SD card 140 is inserted in the SD card slot of the computer terminal 160, and any one screen of FIG. 8A to FIG. 8C is displayed.

If the operator operates the computer terminal 160 and inputs the information into any one of the screens of FIG. 8A to FIG. 8C, the input information will be transmitted to the server 150 from the computer terminal 160.

In the case of the screen of FIG. 8A, the identification information (for example, the model name, the model ID, etc.) for identifying the multi-function peripheral system 31 is not transmitted to the server 150. Therefore, when there are two or more model IDs corresponding to the requesting application program, the computer terminal 160 displays the screen of FIG. 8D on the display unit, so that the operator is requested to choose the desired model ID from among them. Alternatively, the server 150 may display one of the screens of FIG. 8A to FIG. 8D on the display device of the computer terminal 160.

The server 150 performs the user authentication based on both the information stored in the database 170 of FIG. 9 and the information received from the computer terminal 160. When the user authentication is completed normally, the program-addition file for adding the program to the program-initiation SD card 141 is created by the server 150.

The server 150 receives from the database 170 the SD serial ID of the program-initiation SD card of the multi-function peripheral system 31, and creates the program-addition file required for adding the program to the program-initiation SD card 141 as in the flowchart of FIG. 10.

In the processing of FIG. 16 (b), the server 150 transmits the program-addition file to the computer terminal 160, and the program-addition file including at least the requesting application program, the electronic signature of the application program, the configuration file, and the electronic signature of the configuration file.

Figure 17:
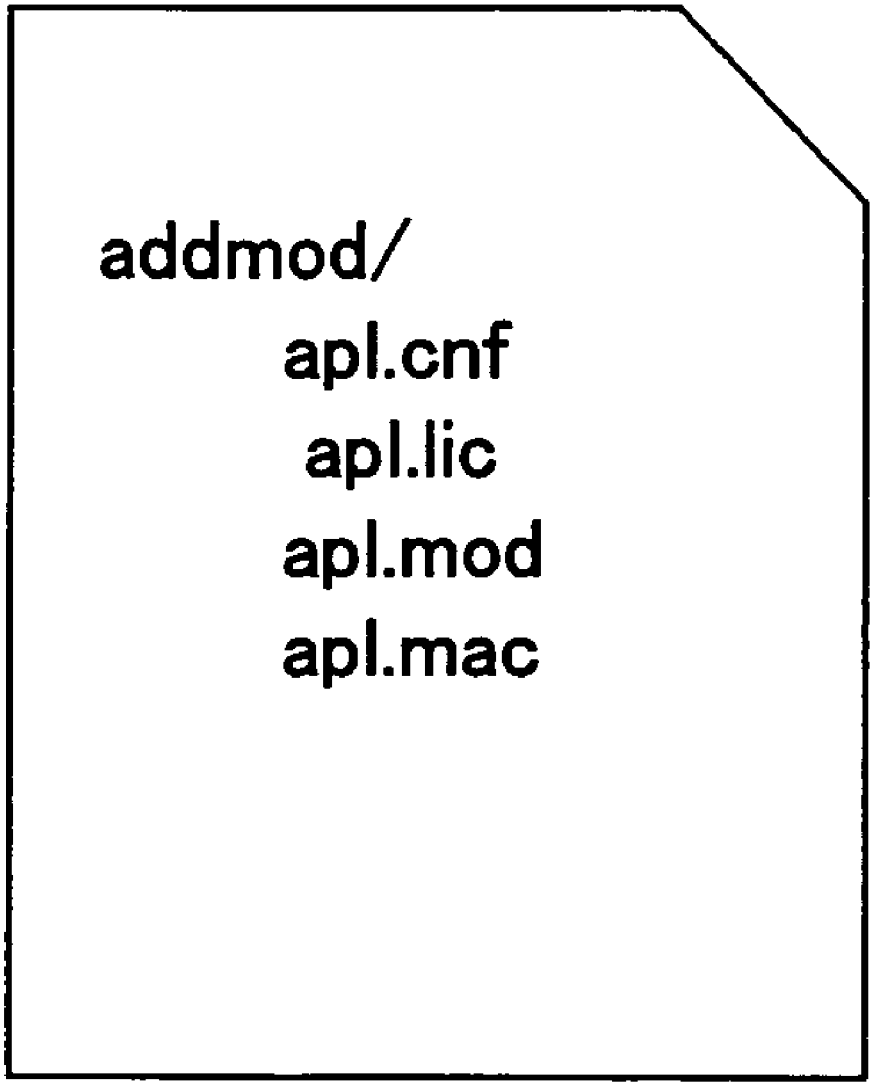
FIG. 17 is a diagram of an example of the program-addition file recorded in the program-addition SD card.

In the processing of FIG. 16 (c), the computer terminal 160 receives from the server 150 the program-addition file, and writes the received program-addition file to the program-addition SD card 140 inserted in the SD card slot, as shown in FIG. 17.

FIG. 17 shows an example of the program-addition SD card in which the program-addition file is recorded. In the example of the program-addition SD card 140 in FIG. 17, "apl.cnf" indicates the configuration file, "apl.lic" indicates the electronic signature of the configuration file, "apl.mod" indicates the requesting application program, and "apl.mac" indicates the electronic signature of the application program.

In the processing of FIG. 16 (d), the program-addition SD card 140 as shown in FIG. 11 is inserted in the SD card slot 110 of the multi-function peripheral system 31. The SD card control unit 133 detects the insertion of the program-addition SD card 140 in the SD card slot 110, and notifies the detected insertion of the SD card to the program initiating unit 131.

In the processing of FIG. 16 (e), the program initiating unit 131 reads the program-addition file from the program-addition SD card 140, and performs the authentication checks of the requesting application program and the configuration file using the electronic authentication check library 134, in order to check the justification of the program-addition file.

For example, the authentication check of the requesting application program is performed as in the flowchart of FIG. 12. Moreover, the authentication check of the configuration file is performed by the program initiating unit 131 as in the flowchart of FIG. 13.

If the program initiating unit 131 checks the justification of the program-addition file read from the program-addition SD card 140, the program initiating unit 131 progresses to the processing of FIG. 16 (f). In the processing of FIG. 16 (f), the program initiating unit 131 mounts the program-addition SD card 140.

In the processing of FIG. 16 (g), the program initiating unit 131 notifies to the SD card control unit 133 that the mounting of the program-addition SD card 140 is completed.

In the processing of FIG. 16 (h), the SD card control unit 133 notifies to the SCS 68 that the preparation to add the program of the program-addition SD card 140 to the program-initiation SD card is completed.

In the processing of FIG. 16 (i), the SCS 68 writes a part or all of the program-addition file read from the program-addition SD card 140, to the program-initiation SD card 141 or the flash ROM 142.

In addition, the SCS 68 determines the addition location of the program-addition file (either the program-initiation SD card 141 or the flash ROM 142) based on the description of the configuration file. Alternatively, the addition location selection screen as shown in FIG. 14 may be displayed on the control panel 120, and the operator may be requested to choose one from among them.

When the program-initiation SD card 141 is chosen as the addition location, the SCS 68 writes the requesting application program, the electronic signature of the application program, the configuration file, and the electronic signature of the configuration file to the program-initiation SD card 141, as shown in FIG. 15.

On the other hand, when the flash ROM 142 is chosen as the addition location, the SCS 68 writes the requesting application program and the configuration file to the program-initiation SD card 141.

According to the processing of FIG. 16, the requesting application program, the electronic signature of the application program, the configuration file, and the electronic signature of the configuration file are acquired not only through the network but also through the application SD card, and the program-initiation SD card 141 of FIG. 14 can be created easily.

When the program of the program-initiation SD card 141 of FIG. 14 is started, the processings of the flowcharts of FIG. 11 and FIG. 12 are performed so that the authentication checks of the application program and the configuration file are performed, and the application program is initiated after the authentication checks are performed. Only the program whose justification has been checked, among the programs currently recorded in the program-initiation SD card 141 can be started safely.

In the above-described embodiments, the description is focused on the processing of the multi-function peripheral system 31, and the same is easily applicable to the information processing apparatus 1 shown in FIG. 1 and FIG. 2.

The present invention is not limited to the above-described embodiments, and variations and modifications may be made without departing from the scope of the present invention.

Further, the present application is based on Japanese priority application No. 2003-076605, filed on Mar. 19, 2003, and Japanese priority application No. 2004-057680, filed on Mar. 2, 2004, the entire contents of which are hereby incorporated by reference.

What is claimed is

1. A file creation method which creates a program-addition file at a server for adding a program to a program-initiation recording medium of an information processing apparatus, comprising the steps of:

acquiring, through a network communication port of the server, identification information of the program-initiation recording medium and model identification of the information processing apparatus in response to a program adding request received from a computer terminal connected to the information processing apparatus via a network; and creating, at the server, a program-addition file in response to the identification information and the model identification so that starting of the program on the information processing apparatus is allowed by the program-addition file with the program stored in the program-initiation recording medium, wherein the program-addition file comprises a program file, an electronic signature of the program file, a configuration file, and an electronic signature of the configuration file, so that starting of the program on the information processing apparatus is allowed by execution of the program-addition file by the information processing apparatus with the program stored in the program-initiation recording medium.

2. The file creation method according to claim 1, further comprising the step of transmitting the program-addition file to the information processing apparatus via a network.

3. The file creation method according to claim 1, further comprising the step of storing the program-addition file in a program-addition recording medium which is used for the addition of the program to the program-initiation recording medium.

4. The file creation method according to claim 1, wherein, in the acquiring step, the identification information is acquired from a predetermined information provider device.

5. The file creation method according to claim 1, wherein the creating step comprises:

acquiring the program file, the electronic signature of the program file, and the configuration file; and creating a second electronic signature of the configuration file based on the identification information of the program-initiation recording medium and the acquired configuration file.

6. The file creation method according to claim 5, wherein the program file, the electronic signature of the program file, and the configuration file are acquired from a predetermined information provider device.

7. A server which creates a program-addition file for adding a program to a program-initiation recording medium of an information processing apparatus, comprising:

an identification-information acquisition unit configured to acquire identification information of the program-initiation recording medium and model identification of the information processing apparatus in response to a program adding request received from a computer terminal connected to the information processing apparatus via a network, the server including a port through which the identification information is received from the network; and a file creation unit configured to create a program-addition file in response to the identification information and model identification, so that starting of the program on the information processing apparatus is allowed by the program-addition file with the program stored in the program-initiation recording medium, the file creation unit including a processor; and a memory device configured to store the program addition file, wherein the program-addition file comprises a program file, an electronic signature of the program file, a configuration file, and an electronic signature of the configuration file, so that starting of the program on the information processing apparatus is allowed by execution of the program-addition file by the information processing apparatus with the program stored in the program-initiation recording medium.

8. The server according to claim 7, further comprising a file transmitting unit transmitting the program-addition file to the information processing apparatus via a network.

9. The server according to claim 7, further comprising a file transmitting unit transmitting the program-addition file to a computer terminal in which the program-addition file is stored in a program-addition recording medium.

10. A computer terminal which stores a program-addition file in a program-addition recording medium, the program-addition file being used to add a program to a program-initiation recording medium of an information processing apparatus, the computer terminal comprising:

an information transmitting unit configured to transmit, to a server, a program adding request, which causes the server to acquire identification information of the program-initiation recording medium and model identification of the information processing apparatus in response to the program adding request;

a file receiving unit configured to receive, from the server, a program-addition file which is created by the server in response to the identification information and the model identification so that starting of the program on the information processing apparatus is allowed by the program-addition file with the program stored in the program-initiation recording medium; and a file storing unit configured to store the received program-addition file into the program-addition recording medium, wherein the program-addition file comprises a program file, an electronic signature of the program file, a configuration file, and an electronic signature of the configuration file, so that starting of the program on the information processing apparatus is allowed by execution of the program-addition file by the information processing apparatus with the program stored in the program-initiation recording medium.

11. A computer-readable storage medium encoded with instructions, which when executed by a computer causes the computer to execute a file creation method which creates a program-addition file for adding a program to a program-initiation recording medium of an information processing apparatus, the file creation method comprising:

acquiring, through a network communication port of the computer, identification information of the program-initiation recording medium and model identification of the information processing apparatus in response to a program adding request received from a computer terminal connected to the information processing apparatus via a network; and creating, at the computer, a program-addition file in response to the identification information and the model identification so that starting of the program on the information processing apparatus is allowed by the program-addition file with the program stored in the program-initiation recording medium, wherein the program-addition file comprises a program file, an electronic signature of the program file, a configuration file, and an electronic signature of the configuration file, so that starting of the program on the information processing apparatus is allowed by execution of the program-addition file by the information processing apparatus with the program stored in the program-initiation recording medium.

12. An information processing apparatus which adds a program to a program-initiation recording medium by using a program-addition recording medium in which a program-addition file for adding the program to the program-initiation recording medium is stored, the information processing apparatus comprising:

a recording-medium detection unit, including a processor, configured to detect the program-addition recording medium in which the program-addition file is recorded; and a program addition unit, including the processor, configured to perform an authentication check of the program-addition file read from the program-addition recording medium based on model identification of the information processing apparatus, and to add the program to the program-initiation recording medium according to a result of the authentication check, wherein the program-addition file comprises a program file, an electronic signature of the program file, a configuration file, and an electronic signature of the configuration file, so that starting of the program on the information processing apparatus is allowed by execution of the program-addition file by the information processing apparatus with the program stored in the program-initiation recording medium.

13. The information processing apparatus according to claim 12, wherein, when there are two or more program-initiation recording mediums, the program addition unit displays a screen to select one of the program-initiation recording mediums, and adds the program to the selected program-initiation recording medium.

14. A program addition system comprising:

a server which creates a program-addition file for being stored in a program-addition recording medium; and an information processing apparatus which adds a program to a program-initiation recording medium by using the program-addition recording medium, wherein the server is configured to acquire identification information of the program-initiation recording medium and model identification of the information processing apparatus in response to a program adding request received from a computer terminal connected to the information processing apparatus via a network, and to create a program-addition file in response to the identification information and the model identification, so that starting of the program on the information processing apparatus is allowed by the program-addition file with the program stored in the program-initiation recording medium, wherein the information processing apparatus is configured to detect the program-addition recording medium in which the program-addition file is recorded, to perform an authentication check of the program-addition file read from the program-addition recording medium, and to add the program to the program-initiation recording medium according to a result of the authentication check, wherein the program-addition file comprises a program file, an electronic signature of the program file, a configuration file, and an electronic signature of the configuration file, so that starting of the program on the information processing apparatus is allowed by execution of the program-addition file by the information processing apparatus with the program stored in the program-initiation recording medium.

15. A program addition system comprising:

a server which creates a program-addition file for being stored in a program-addition recording medium; and an information processing apparatus which adds a program to a program-initiation recording medium by using the program-addition recording medium, wherein the server is configured to acquire identification information of the program-initiation recording medium and model identification of the information processing apparatus in response to a program adding request received from a computer terminal connected to the information processing apparatus via a network, and to create a program-addition file in response to the identification information and the model identification, so that starting of the program on the information processing apparatus is allowed by the program-addition file with the program stored in the program-initiation recording medium, wherein the information processing apparatus is configured to receive the program-addition file from the server, to perform an authentication check of the received program-addition file, and to add the program to the program-initiation recording medium according to a result of the authentication check, wherein the program-addition file comprises a program file, an electronic signature of the program file, a configuration file, and an electronic signature of the configuration file, so that starting of the program on the information processing apparatus is allowed by execution of the program-addition file by the information processing apparatus with the program stored in the program-initiation recording medium.

16. The computer terminal of claim 10, further comprising:
a processor, wherein
the processor, an interface device, and a memory device are interconnected by a bus.

17. The information processing apparatus of claim 12, further comprising:
a memory device;
an application specific integrated circuit; and
a network interface,
wherein the processor, the memory device, the network interface, and the application specific integrated circuit being interconnected by a bus.

18. The program addition system of claim 14, wherein the information processing apparatus comprises:
a processor;
a memory device;
an application specific integrated circuit; and
a network interface,
wherein the processor, the memory device, the network interface, and the application specific integrated circuit being interconnected by a bus.

19. The program addition system of claim 15, wherein the information processing apparatus comprises:
a processor;
a memory device;
an application specific integrated circuit; and
a network interface,
wherein the processor, the memory device, the network interface, and the application specific integrated circuit being interconnected by a bus.

* * * * *